United States Patent Office 3,062,783
Patented Nov. 6, 1962

3,062,783
REACTION PRODUCTS OF POLYMETHYLOL PHENOL AND SULFITED TANNINS
Kenneth Russell Gray and Franklin W. Herrick, Shelton, Wash., assignors to Rayonier Incorporated, Shelton, Wash., a corporation of Delaware
No Drawing. Filed Oct. 2, 1957, Ser. No. 687,622
8 Claims. (Cl. 260—49)

This invention relates to compositions of matter derived from wood or the bark of coniferous trees and phenolic condensates, and has for its object the provision of new and improved products formed by reacting together such derived wood or bark material and polymethylolphenol condensates. The new products of our invention are reaction products or complexes of compounds and polymeric materials formed as a result of reacting certain polymethylolphenol condensates with catechin-type tannin extracts of suitable woods or with derivatives obtained by digesting suitable wood or coniferous barks with an alkali metal or ammonia salt of sulfurous acid.

The improved products of our invention are particularly and presently advantageously effective for use as fluid loss control agents in well drilling muds. We have discovered that the products of bark derivatives and the polymethylolphenol condensate are extremely effective fluid loss control agents for various kinds of drilling muds used under many different conditions, and our invention accordingly provides improved drilling muds comprising our new product.

The polymethylolphenol condensate is prepared by partially condensing 2.0 to 3.0 moles of formaldehyde with 1.0 mole of phenol under carefully controlled alkaline conditions and temperature.

The derivatives obtained by digesting the coniferous tree barks give products with polymethylolphenol that vary in their effectiveness as fluid loss control agents. The barks of Douglas fir (*Pseudotsuga menziesii*), white fir (*Abies amabilis*), western hemlock (*Tsuga heterophylla*), eastern hemlock (*Tsuga canadensis*), southern yellow pine (among the several species of which are: slash pine, *Pinus elliotti;* longleaf pine, *Pinus palustris;* loblolly pine, *Pinus taeda;* and shortleaf pine, *Pinus echinata*), Ponderosa pine (*Pinus ponderosa*), Lodgepole pine (*Pinus contorta*), Sitka spruce (*Picea sitchensis*), and Redwood (*Sequoia sempervirens*) yield bark derivatives when digested in aqueous solutions of alkali metal salts of sulfurous acid which are advantageously suitable for use in forming the products of our invention. Not all tree barks yield products of equal effectiveness but, in general, barks from coniferous trees yield useful products.

Tree bark is usually obtained in large pieces. These are reduced, as in a hammermill, to a state of subdivision more suitable for efficient digestion; for example, to a size that will pass through a screen having openings from 7/16 to 11/16 inch. Care should be taken to avoid formation of excessive fines, as the insoluble part thereof will later tend to impede filtration. For digestion, aqueous solutions of ammonium, potassium or sodium salts of sulfurous acid may be used, the solutions of the sodium salts generally being preferred for economic reasons. The digestions may be carried out at temperatures ranging from 105° C. to 200° C. but for digestions that are both rapid and relatively efficient, temperatures of from about 125° C. to 175° C. are preferred. When temperatures much above 175° C. are used, some degradation of the extracted product takes place and no compensating increase in yield is obtained, and when temperatures much below 125° C. are used the advantages of high yield and short extraction time are lost. Digestion periods of about 15 minutes to about 4.0 hours are used, but at all events the digestions are stopped while there still remains some content of sulfurous acid salt in the charge. A smaller proportion of the alkali metal salt of sulfurous acid than that equivalent to about 0.01 part of sulfur dioxide per part of oven-dry bark is insufficient, but more salt than that equivalent to about 0.30 part sulfur dioxide per part of oven-dry bark is more than is needed to carry out the reaction satisfactorily. The preferred range is chemical equivalent to about 0.05 to 0.15 part of sulfur dioxide per part of oven-dry bark. A slight excess of chemicals acts as a buffer to protect the derivative, particularly at higher temperatures. On the other hand, it is important to avoid such an excessive amount of salt as to cause serious contamination therewith of the water-soluble products derived from the process.

In using the subdivided bark of the sizes indicated, about 10 to 20% of the bark on the basis of its equivalent oven-dry weight is desirable in the charge, the rest of the charge being water and sulfurous acid salt, preferably a mixture of sodium bisulfite and sodium sulfite. The amounts of water indicated are preferable, since such amounts provide water to act as solvent for the inorganic material and for the sulfonated bark derivatives as well as to provide the presence of water and sulfurous acid radical in the reaction mass. Amounts of water in excess of the proportions indicated may be present, but require excessive space in the digesters and eventually give very dilute product solutions requiring a correspondingly costly evaporation to produce the solids in the form of concentrated solutions or in dry form.

Effective and rapid separation of all soluble products of digestion is preferably accomplished by mechanical dislodging aids. Such mechanical dislodging aids or expressing means effectively separate occluded solution and the soluble reaction product contained therein from the bark residue. Expressing, as by compressing the mixture of watery material and bark residue in a continuous screw press or in a batch hydraulic press is especially effective, in that solutions of maximum concentration are producible.

The solutions usually contain a small amount of insoluble material such as bark in fine subdivision which, if desired, may be separated by filtration. The products may be used in the form of water solutions of suitable concentration or in the form of solids. Concentration of the solutions may be effected by known methods of evaporation, either at atmospheric or reduced pressure, but sustained temperatures not exceeding those used in the digestion of the bark are preferable in order to avoid degradation of the phenolic material present. Solid products may be produced by known methods such as spray drying and drum drying, conducted at atmospheric or reduced pressures, preferably avoiding excessive temperatures and oxidizing conditions that might affect the product where further reactions are not desired.

Bark derivatives suitable for the present purpose are composed mostly of water-insoluble hydroxy aromatic materials such as phlobaphenes and polymeric phenolic acids that have been solubilized by digestion with the cited liquors along with a small amount of water-soluble tannins. A considerable proportion of the originally insoluble part of the bark is converted by the process of digestion into water-soluble sulfonated salts of hydroxy aromatic compounds. Beside these organic salts, the water-soluble solids in the reaction product comprise small amounts of sulfurous and sulfuric acid salts derived from the charged inorganic chemicals. The ratio of organic to inorganic material present in the solid product varies and depends upon a number of factors, among which are the amount of convertible material in the bark, the amount of the insoluble proportion of the bark material converted and the proportion of bark to inorganic sulfurous acid salt used in the charge. The product contains relatively large proportions of phenolic hydroxyl groups.

The bark derivatives suitable for forming products of the invention may be produced as illustrated by the following example, wherein parts are expressed in parts by weight.

EXAMPLE 1

A digester was charged with 45 parts of wet hemlock bark (*Tsuga heterophylla*) ground to pass through a screen having openings 7/16 by 11/16 inch, corresponding to 15 parts of dry bark and 46 parts of water containing 2.8 parts of sodium sulfite. The charge was heated to 156° C. in 14 minutes with agitation, held at this temperature for 17 minutes and then relieved to atmospheric pressure in 3 minutes. It was then emptied out onto a fine mesh filter screen and the residual solids washed with hot water. The filtrate and washings were concentrated to about 40% total solids content and spray dried to yield 8.52 parts of a reddish-brown powder.

In the above reaction mixture, the ratio of dry bark to water was 0.16 and the ratio of $SO_2$ to bark was 0.09. The gross yield of dry product was 56.8% based on the dry weight of the original bark, and the net yield of solubilized organic material was 39.1%. The uncombined chemical in the product was equivalent to 4.41% $SO_2$.

The net yield of organic solids is a measure of the bark material that goes into the product solution and is determined by the formula $$Y = \frac{St - Si}{W} 100$$

where Y is the percent net yield, $St$ is the weight of the total solid content of the liquor, $Si$ is the weight of inorganic salt employed in the process and W is the weight of oven-dry bark treated.

EXAMPLE 2

Bark derivatives somewhat similar to those of Example 1 that are useful in the present invention were prepared from the same and other species of coniferous tree barks using the conditions given in Table I.

Any wood that will yield catechin-type tannin products similar to those derivatives obtained by the aforementioned digestion of coniferous bark can be reacted with the polymethylolphenol for the products of our invention. We have found quebracho wood to be especially effective for this purpose. The wood may be chipped or otherwise reduced to small particles and digested with the chemical and under the conditions listed in Table 1, or the wood may be leached with hot water to form extracts similar to those sold commercially and these aqueous extracts may be reacted with the aforementioned chemicals to form the sulfited wood derivatives.

The following example illustrates the preparation of a derivative from an extract of quebracho wood:

EXAMPLE 1A

*Preparation of the Sulfited Quebacho Extract*

A reaction vessel equipped with stirrer, reflux condenser and heat source was charged with 300 parts, dry basis, of a commercial-grade of quebracho wood extract as used in the drilling mud industry, this material being substantially insoluble in cold water, 45 parts of anhydrous sodium sulfite and 1035 parts of water. This reaction mixture was heated to 95° C. and held at that temperature for two hours, after which it was cooled to room temperature. The sulfited extract was completely solubilized by the treatment and the final solution thereof had a pH of 7.1 and contained 25.1% solids.

Phenol has three reactive positions, and each molecule can react with three molecules of formaldehyde. This was demonstrated by Granger, Ind. Eng. Chem. 29, 860, (1937), and the product trimethylol phenol has been isolated from this reaction by Freeman, J.A.C.S., 74, 6257 (1952). When a mixture of phenol and excess formaldehyde is heated under alkaline conditions an insoluble, infusible resin is formed in which the ratio of formaldehyde to phenol is about 1.5 to 1.6. If the condensation went infinitely far, the ratio would be 1.5, but actually there are end groups which may contain free methylol groups so that ratio is slightly above 1.5. If trimethylol phenol is heated in the presence of alkali, it will form the same end-product with a formaldehyde-phenol ratio of about 1.5 to 1.6. The excess formaldehyde is split out in the reaction. A polymethylol com-

TABLE I

Extraction of Coniferous Tree Barks with Salts of Sulfurous Acid

| Extract No. | Tree species | Reaction | | | $SO_2$:bark ratio | Percent yield of product | |
|---|---|---|---|---|---|---|---|
| | | Chemical (as percent of $SO_2$) | Time, mins. | Temp., °C. | | Gross | Net |
| 1 | Western hemlock | $Na_2SO_3$, 100 | 19 | 150 | 0.05 | 40.7 | 30.8 |
| 2 | ----do---- | $Na_2SO_3$, 100 | 120 | 150 | 0.10 | 62.2 | 42.6 |
| 3 | ----do---- | $Na_2SO_3$, 100 | 20 | 170 | 0.09 | 52.7 | 35.0 |
| 4 | ----do---- | ($NaHSO_3$, 75); ($Na_2SO_3$, 25) | 49 | 160 | 0.07 | 46.3 | 34.3 |
| 5 | ----do---- | $NaHSO_3$, 100 | 120 | 150 | 0.10 | 50.4 | 35.5 |
| 6 | ----do---- | $(NH_4)_2SO_3$, 100 | 36 | 125 | 0.05 | 21.8 | 12.7 |
| 7 | Douglas fir | $Na_2SO_3$, 100 | 30 | 150 | 0.09 | 49.0 | 31.3 |
| 8 | ----do---- | $Na_2SO_3$, 100 | 120 | 150 | 0.10 | 63.9 | 44.2 |
| 9 | ----do---- | ($NaHSO_3$, 75); ($Na_2SO_3$, 25) | 26 | 170 | 0.07 | 46.2 | 34.2 |
| 10 | ----do---- | $(NH_4)_2SO_3$, 100 | 30 | 150 | 0.09 | 38.6 | 22.3 |
| 11 | Amabilis fir | $Na_2SO_3$, 100 | 30 | 150 | 0.09 | 47.3 | 29.6 |
| 12 | ----do---- | ($NaHSO_3$, 75); ($Na_2SO_3$, 25) | 30 | 170 | 0.09 | 41.3 | 29.3 |
| 13 | Mixed southern pine [1] | $Na_2SO_3$, 100 | 30 | 150 | 0.09 | 43.7 | 26.0 |
| 14 | ----do---- | ($NaHSO_3$, 75); ($Na_2SO_3$, 25) | 22 | 170 | 0.07 | 44.8 | 32.8 |
| 15 | ----do---- | $NaHSO_3$, 100 | 30 | 150 | 0.09 | 37.1 | 23.7 |
| 16 | ----do---- | $(NH_4)_2SO_3$, 100 | 30 | 150 | 0.09 | 43.8 | 27.5 |
| 17 | Lodgepole pine | $Na_2SO_3$, 100 | 30 | 150 | 0.09 | 59.5 | 41.8 |
| 18 | Ponderosa pine | $Na_2SO_3$, 100 | 30 | 150 | 0.09 | 48.5 | 30.8 |
| 19 | Sitka Spruce | $Na_2SO_3$, 100 | 30 | 150 | 0.09 | 67.7 | 50.0 |
| 20 | ----do---- | ($NaHSO_3$, 75); ($Na_2SO_3$, 25) | 32 | 170 | 0.07 | 67.7 | 55.7 |
| 21 | ----do---- | $(NH_4)_2SO_3$, 100 | 30 | 150 | 0.09 | 48.6 | 32.3 |
| 22 | Redwood | $Na_2SO_3$, 100 | 120 | 150 | 0.10 | 54.4 | 36.5 |
| 23 | ----do---- | ($NaHSO_3$, 75); ($Na_2SO_3$, 25) | 30 | 170 | 0.07 | 34.9 | 22.9 |
| 24 | Mixed western hemlock—Amabilis fir [2] | $Na_2SO_3$, 100 | 30 | 150 | 0.07 | 49.0 | 35.2 |
| 25 | ----do---- | ($NaHSO_3$, 75); ($Na_2SO_3$, 25) | 30 | 150 | 0.07 | 37.6 | 25.6 |

[1] Bark mixture contains 63.9% longleaf pine, 33.0% slash pine and 3.1% loblolly pine barks.
[2] Bark mixture contains 30% Amabilis fir and 70% western hemlock.

pound such as trimethylol phenol or a low condensed polymethylolphenol having a formaldehyde-to-phenol ratio of over 2.0 can be condensed with the foregoing bark derivatives in alkaline solution to form our new product.

Formaldehyde reacts very rapidly with phenol in the presence of a high molar ratio of sodium hydroxide. In the presence of about 0.75 mole of sodium hydroxide per mole of phenol, the reaction with formaldehyde is strongly exothermic and the reaction mixture heats up to refluxing temperature of its own accord. If the reaction mixture is cooled rapidly after the exotherm has subsided, the solution is free of formaldehyde, provided the ratio of formaldehyde to phenol is less than 3. The Cannizzaro reaction in which formaldehyde is converted to methanol and sodium formate is also favored by high mole ratios of sodium hydroxide and high temperature; however, its reaction rate is slower than the rate of reaction of formaldehyde with phenol under these conditions. If the strongly alkaline solution of polymethylolphenol is heated, another reaction occurs which results in the condensation of the polymethylolphenol to a polymer and the simultaneous liberation of formaldehyde.

The formation of trimethylol phenol, its condensation and the Cannizzaro reaction are illustrated by the following equations:

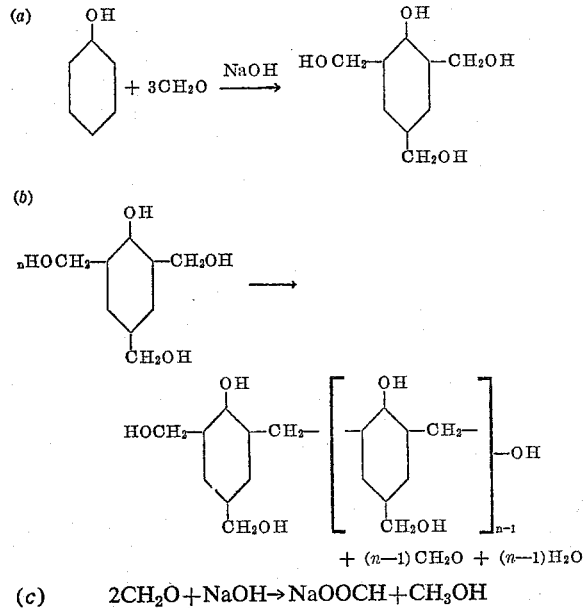

(c) $2CH_2O + NaOH \rightarrow NaOOCH + CH_3OH$

In Reaction $a$, a trimethylolphenol is formed.

In Reaction $b$, free formaldehyde is liberated and a polymer containing a lower ratio of formaldehyde to phenol is formed.

The loss of reactive methylol groups in the polymethylolphenol is a disadvantage, since there are then fewer reactive functional groups available to react with the bark derivative. The Cannizzaro Reaction $c$ should be avoided as much as possible, since it merely results in the loss of valuable formaldehyde.

The reaction product of phenol with formaldehyde contains a mixture of monomeric polymethylolphenols and low molecular weight condensation compounds. This is in agreement with the published work of Freeman, Journal Am. Chem. Soc., 74, 6257 (1952), and Anal. Chem., 24, 955 (1952), who demonstrated the formation of dimers. Kammerer, Makromol, Chem., 8, 85 (1952), also showed that polymethylolphenols split out formaldehyde when heated with alkali, as indicated in Equation $b$. It would be desirable to limit the reaction of formaldehyde and phenol so as to form only monomeric products, since then full use of the formaldehyde could be made in a later reaction with bark derivatives.

This is, however, not practical, since the reaction of formaldehyde with phenol is too slow at low temperature and the higher temperature used to promote the reaction also promotes the condensation to polymeric products. Furthermore, the sodium salts of trimethylolphenol and tetramethylol dihydroxy diphenyl methane ($n=2$) have limited solubility in water and tend to crystallize from solution. Therefore, a compromise must be reached by maintaining the reaction mixture at an elevated temperature only long enough to effect complete reaction of the formaldehyde. The condensation to polymers, on the other hand, is held to a minimum by cooling to stop the reaction as soon as the formaldehyde has all reacted.

Assuming that all available positions ortho and para to the hydroxyl are reacted with formaldehyde at the end of the heating period, the degree of condensation can be estimated as follows: referring to Equation $c$, it is evident that the only reaction resulting in the disappearance of sodium hydroxide is the Cannizzaro reaction and that each mole of sodium hydroxide consumed in this reaction corresponds to the disappearance of two moles of formaldehyde. In order then to determine the number of moles of formaldehyde involved in the Cannizzaro reaction, it is only necessary to determine by titration the number of moles of sodium hydroxide consumed and to multiply by 2. The number of moles of formaldehyde combined with phenol is obtained by subtracting the number of moles involved in the Cannizzaro reaction from the total number added at the start of the reaction. Dividing by the number of moles of phenol used in the reaction then gives the ratio of combined formaldehyde to phenol. Actually, it is difficult to obtain a combined ratio of formaldehyde to phenol above 2.5, and examples given in this specification range in value from 1.93 to 2.85.

In the case of trimethylolphenol (Equation $a$), the chain length or degree of polymerization may be calculated from the following equation:

$$n = \frac{1}{X-2}$$

where X is the molar ratio of combined formaldehyde to phenol and $n$ is the average number of phenol units in a molecule of product. Trimethylolphenol would have an $n$-value of 1 and tetramethyl dihydroxy diphenyl methane would have an $n$-value of 2. The preferred condensation products useful in this invention would have $n$-values ranging from 1 to 5. Other phenols having at least two reactive positions for forming methylol derivatives such as cresols, 3,5-xylenol, catechol, etc., are also useful in preparing the following phenol condensates of this invention.

The following examples illustrate the preparation of the polymethylolphenol.

EXAMPLE 3

A reaction vessel equipped with an efficient cooling coil, a mechanical stirrer and a reflux condenser was charged with 88.5 parts of phenol. To this was added a solution of 213 parts of 34.5% formaldehyde, 26.6 parts of sodium hydroxide and 50 parts of water. The mixture was stirred without heating. The temperature rose rapidly because of the exothermic character of the reaction and reached the boiling point of the solution. After refluxing for about 10 minutes, the reaction subsided and the solution was cooled rapidly to room temperature by running cold water through the cooling coil. Analysis for formaldehyde in the finished solution showed this to be absent. Titration with 0.1 N hydrochloric acid showed 25 parts of NaOH remaining. The loss of sodium hydroxide is accounted for by the Cannizzaro reaction and corresponds to the reaction of 2.4 parts of formaldehyde. The remainder of the formaldehyde used condensed with the phenol. The mole ratio of formaldehyde condensed with phenol is 2.52. The solution was very thin (less than 10 centipoises at 25° C. and a calculated concentration of 49.5% solids). On standing, it deposited fine white crystals of the sodium salt of polymethylolphenol.

EXAMPLE 4

A reaction vessel equipped with an efficient cooling coil, a mechanical stirrer and reflux condenser was charged with 94 parts of phenol, 91.2 parts of paraformaldehyde and 124 parts of water. While stirring, a solution containing 22 parts of sodium hydroxide in 100 parts of water was added and heat was applied to initiate the reaction. An exothermic reaction occurred following which the solution was rapidly cooled to room temperature. Analysis showed no free formaldehyde. Titration with 0.1 N hydrochloric acid indicated a total loss of 1.5 parts of formaldehyde by Cannizzaro reaction. The mole ratio of combined formaldehyde to phenol was 2.85. The viscosity of the solution was less than 10 centipoises at 25° C.

EXAMPLE 5

A reaction vessel equipped with an efficient cooling coil, mechanical stirrer and reflux condenser was charged with 94 parts of phenol and 174 parts of 34.5% formaldehyde. The resulting mixture was cooled to 20° C. and a solution containing 10 parts of sodium hydroxide dissolved in 20 parts of water was added. The reaction mixture was stirred and heat was supplied from a heating mantle to raise the temperature to 95° C. in 20 minutes. Heating was then discontinued and the reaction mixture was stirred for 30 minutes at 95° C. After cooling rapidly to room temperature, the finished solution was found to contain 0.2% free formaldehyde, 46.6% cured resin solids and had a viscosity of 37.5 centipoises at 25° C. The mole ratio of formaldehyde condensed with phenol was 1.93.

EXAMPLE 6

The reaction apparatus of Example 3 was charged with 110 parts of a mixture of technical-grade cresols containing 54% m-cresol, 29% p-cresol and 17% other phenols, and 209 parts of 34.5% formaldehyde. These reagents were cooled to 20° C. and a solution containing 30 parts of sodium hydroxide dissolved in 50 parts of water was added with stirring. Cold water was circulated through the cooling coil and in 3 minutes the reaction temperature rose to 90° C. An ice water bath was then used to cool the product solution to room temperature. The finished solution had a viscosity of 48.5 centipoises at 25° C. and contained 43% cured resin solids and no free formaldehyde. The mole ratios of formaldehyde and sodium hydroxide to cresol in the above reaction mixture were 2.4 and 0.75 respectively.

EXAMPLE 7

The reaction apparatus of Example 3 was charged with 108 parts of m-cresol and 226 parts of 34.5% formaldehyde and the mixture was cooled to 20° C. A solution containing 30 parts of sodium hydroxide dissolved in 50 parts of water was then added with continuous cooling and stirring. Exothermic heat was dissipated in about 20 minutes, during which time the reaction temperature rose to 58° C. Heat was then supplied to raise the temperature to 80° C. in 30 minutes and this temperature was maintained for 15 minutes. The reaction mixture was then cooled rapidly to room temperature with an ice water bath. The finished solution had a viscosity of 42.5 centipoises at 25° C. and contained 43.8% cured resin solids and no free formaldehyde. The mole ratios of formaldehyde and sodium hydroxide to m-cresol in the above reaction mixture were 2.6 and 0.75 respectively.

EXAMPLE 8

A reaction vessel equipped with mechanical agitator reflux condenser, cooling jacket and temperature recorder was charged with 25.4 parts of 94.5% phenol and 54 parts of 37% formaldehyde. The solution was cooled to 20–25° C. and 20.6 parts of 36% sodium hydroxide solution was added. The agitator was started and the temperature rose from the heat of reaction to 65° C. in 13 minutes. Cooling water was then turned into the jacket and the temperature rose more gradually to 85° C. in 8 minutes. Hot water was then turned into the jacket to bring the reaction temperature to 92° C. where the mixture refluxed. The hot water was then turned off and the mixture continued to reflux for 30 minutes, at which time cold water was turned into the jacket to cool the mixture and stop the reaction. The resulting solution had a specific gravity of 1.195, a cured resin solids content of 47.2% and a viscosity at 25° C. of 41 centipoises. Analysis as outlined above indicated a combined formaldehyde-to-phenol mole ratio of 2.45.

In a like manner, various other polymethylolphenol solutions were prepared using mole ratios of sodium hydroxide to phenol of 0.25 to 1.0 and mole ratios of formaldehyde to phenol of 2.0 to 3.0. From an economic standpoint, the polymethylolphenols containing the higher formaldehyde-to-phenol mole ratios are preferred because the ratio of phenol to bark derivative necessary for the reaction is lower.

We prefer not to separate the polymethylolphenol from the solution in which it is formed because the residual sodium hydroxide present stabilizes the trimethylolphenol. Moreover, the sodium hydroxide aids in the reaction with the bark derivative.

The new fluid loss control agents of our invention are formed by reacting a suitable partially condensed polymethylolphenol having a combined formaldehyde-to-phenol mole ratio of from 1.8 to 3.0 with one of the above described bark derivatives or with the sulfited catechin-type tannin derivative in a weight ratio of phenol to bark or wood derivative of from 0.1 to 0.4 and at an elevated temperature. With respect to design of equipment and ease of processing, we find it preferable to react the polymethylolphenol in the alkaline solution in which it was formed with an aqueous alkaline solution of the bark derivative at a temperature of from 125° C. to 150° C. for from 15 minutes to 1 hour, the ratio of polymethylolphenol (expressed as phenol) to bark derivative ranging from 0.1 to 0.2 and the total solids in the solution ranging from 20% to 40%. Temperatures ranging from 75° C. to 175° C. and times ranging from 15 minutes to 24 hours and more dilute or concentrated reaction mixtures can be used, however, to form operative products. Suitable products can be formed either in a continuous or a batchwise process but, in any event, as soon as the reaction has progressed to the desired point it is stopped by cooling the mixture. The finished product is then obtained by drying said mixture; for example, in a spray or drum dryer, from which it will emerge as a fine, chestnut-brown powder.

In the foregoing process, excess inorganic extracting chemical present in the bark derivative as a salt of sulfurous acid will have an effect on the choice of reaction conditions to be used. Said excess salts react with polymethylolphenols to form sulfonated derivatives, and thus reduce some of their inherent cross-linking capacity for the bark derivatives. On the other hand, some excess chemical is desirable to prevent too fast gelation of the final product. The amount of excess chemical should, therefore, be kept within certain limits. For example, when over 5.0% is present, we find that the ratio of polymethylolphenol (as phenol) to bark derivative must be about 0.2 or more. If the amount of excess chemical is maintained at less than 2%, however, polymethylolphenol (as phenol) to bark ratios as low as 0.1 can be used.

The following procedure was used in forming the fluid loss control agents of the invention:

EXAMPLE 9

A steam-heated and water-cooled autoclave was charged with a homogeneous solution of 250 parts dry basis bark derivative, as prepared in Example 1, and 204 parts of a polymethylolphenol solution similar to that prepared in Example 8 containing 24.5% phenol, 44.5% cured resin solids and having a viscosity of 0.5 poises at 25° C., dissolved in 880 parts of water. The solution contained 25.5% total solids and had a pH of 9.25 and a viscosity of 0.24 poises at 25° C. The autoclave was sealed and heated with stirring to 150° C. in 8 minutes, held at this temperature for 30 minutes and then cooled to room temperature. The final solution had a pH of 9.4 and a viscosity of 0.86 poises at 25° C. This solution was spray dried using 315° C. inlet gas to yield a free-flowing brown powder.

EXAMPLE 10

This example demonstrated the preparation of a fluid loss control agent where sodium sulfite is added to the reaction mixture.

A steam-heated and water-cooled autoclave was charged with a solution of 250 parts dry basis dark derivative prepared using the conditions for extract No. 4 of Table I (Example 2) and containing 1.7% $SO_2$, 204 parts of polymethylolphenol solution prepared as in Example 8 containing 24.5% phenol, 44.5% cured resin solids and having a viscosity of 0.61 poises at 25° C., and 12.5 parts of anhydrous sodium sulfite dissolved in 928 parts of water. The mixture contained 24.3% total solids and had a pH of 9.55 and a viscosity of 0.1 poises at 25° C. The autoclave was sealed and heated with stirring to 145° C. in 30 minutes and from 145° C. to 150° C. in 30 minutes and then cooled to room temperature. The final solution had a pH of 9.15 and a viscosity of 0.515 poises at 25° C. and was spray dried as in the previous example.

EXAMPLE 11

In a manner similar to that used in Examples 9 and 10, additional fluid loss agents were prepared as illustrated in the following table:

The following example illustrates the preparation of our new phenolic product from the quebracho derivative of Example 1A and the polymethylolphenol condensate of Example 8:

EXAMPLE 2B

*Preparation of the Fluid Loss Control Agent (From Sulfited Quebracho Wood Extract and a Polymethylolphenol Condensate)*

An autoclave was charged with 600 parts of the above sulfited quebracho solution representing 150 parts of solids, 62 parts of the polymethylolphenol product of Example 8, 8.8 parts of sodium hydroxide and 53 parts of water. The reaction mixture was stirred and heated to 150° C. and held there for 30 minutes, after which it was cooled to room temperature. The reaction mixture had an initial pH of 9.4 and a viscosity of 0.12 poises at 25° C. The final solution had a pH of 9.25 and a viscosity of 0.155 poises at 25° C. This final product solution was concentrated and spray dried to yield a water-soluble, reddish-brown powder. The ratio of phenol (as a polymethylolphenol derivative) to quebracho wood extract in the above product was 0.1.

Fluid loss control agents, such as the foregoing, are used in drilling muds to minimize and control the loss of water from the drilling mud into the formation being drilled. An ideal fluid loss control agent would make the thin plastered cake of mud on the wall of the drill hole impervious to water, it would be soluble in the drilling mud over the pH range used, heat-stable, resistant to fermentation, inexpensive and plentiful. The product of our invention meets these requirements.

At this time, among the more commonly-used fluid loss control agents are: starches, carboxymethylcelluloses (CMC) and polyacrylonitriles.

In fresh water drilling muds, the product of the invention was found to be approximately equal to starch for TABLE II
Preparation of Fluid Loss Control Agents

| Product No. | Bark derivative of Ex. No., Extract No. | Polymethylolphenol of Example No. | Ratio, phenol to bark deriv. | Reaction Conditions ||||| Final viscosity poises at 25° C. |
|---|---|---|---|---|---|---|---|---|
| | | | | Time, hrs. | Temp., °C. | Percent total solids | pH | |
| 1 | 1 | 8 | 0.2 | 3.0 | 95 | 25.0 | 9.5 | 0.48 |
| 2 | 1 | 8 | 0.2 | 24.0 | 95 | 24.2 | 9.5 | Gel |
| 3 | 1 | 8 | 0.2 | 3.0 | 110 | 25.0 | 9.5 | 1.4 |
| 4 | 1 | 8 | 0.2 | 0.5 | 150 | 24.6 | 9.2 | 0.6 |
| 5 | 1 | 8 | 0.2 | 8.0 | 150 | 24.8 | 9.7 | 0.95 |
| 6 | 1 | 8 | 0.2 | 3.0 | 125 | 30.0 | 9.8 | Gel |
| 7 | 1 | 8 | 0.15 | 0.5 | 125 | 35.0 | 9.4 | 120 |
| 8 | 1 | 8 | 0.1 | 12.0 | 95 | 39.8 | 9.35 | Gel |
| 9 | 1 | 8 | 0.3 | 5.0 | 95 | 25.0 | 9.8 | Gel |
| 10 | 1 | 8 | 0.4 | 3.0 | 95 | 25.0 | 10.0 | Gel |
| 11 | 2-4 | 8 | 0.2 | 0.5 | 125 | 25.0 | 9.8 | 12.5 |
| 12 | 2-4 | 8 | 0.1 | 0.25 | 120 | 40.0 | 9.3 | 1,000+ |
| 13 | 2-4 | 8 | 0.1 | 0.5 | 150 | 40.0 | 9.3 | Gel |
| 14 | 2-6 | 8 | 0.1 | 0.5 | 150 | 25.0 | 9.7 | 3.3 |
| 15 | 2-4 [1] | 8 | 0.2 | 0.5 | 150 | 24.3 | 9.55 | 0.515 |
| 16 | 2-4 [2] | 8 | 0.2 | 0.5 | 150 | 24.2 | 10.9 | 0.15 |
| 17 | 2-4 | 5 | 0.2 | 0.5 | 150 | 25.6 | 9.2 | 1,000+ |
| 18 | 2-4 | 4 | 0.1 | 0.5 | 150 | 24.2 | 9.35 | 1.8 |
| 19 | 1 | 7 | 0.2 | 0.5 | 150 | 24.0 | 9.55 | 24.2 |
| 20 | 1 | 6 | 0.2 | 0.5 | 150 | 24.4 | 9.6 | 0.35 |
| 21 | 2-11 | 8 | 0.2 | 0.5 | 150 | 25.0 | 9.8 | 0.5 |
| 22 | 2-9 | 8 | 0.2 | 1.0 | 150 | 25.6 | 9.6 | Gel |
| 23 | 2-14 | 8 | 0.2 | 1.0 | 150 | 25.2 | 9.7 | 3.46 |
| 24 | 2-17 | 8 | 0.2 | 0.5 | 150 | 24.2 | 8.9 | Gel |
| 25 | 2-20 | 8 | 0.1 | 0.5 | 150 | 25.0 | 9.4 | 0.52 |
| 26 | 2-19 | 8 | 0.2 | 0.5 | 150 | 25.0 | 9.25 | Gel |
| 27 | 2-23 | 8 | 0.1 | 0.5 | 150 | 24.2 | 7.9 | Gel |
| 28 | 2-22 | 8 | 0.2 | 0.5 | 150 | 25.0 | 9.8 | 3.8 |

[1] Added ratio 0.05 of $Na_2SO_3$ to dry product.
[2] Added ratio 0.1 of NaOH to dry product.

The products in the above table, with one exception, were all spray dried using an inlet gas temperature of approximately 315° C., those that were gels or had high viscosities being suitably diluted with water prior to drying. One product (No. 3 in the table) was drum dried at atmospheric pressure and 150° C. with equally good results.

fluid loss control and superior to it with regard to heat stability, resistance to fermentation and effect on rheological properties. More of the new product is required to give the same fluid loss control as CMC, but CMC adversely affects rheological properties and has considerably less heat stability. A comparison of the new product with CMC for fluid loss control at high temperatures, with or without thinners, shows that when heated to 205° C., CMC almost completely loses its effectiveness, whereas our new products are practically unaffected with regard to both rheological properties and ability to control fluid loss. We have found that our new products are not only effective after prolonged heating at high temperatures, such as at 210° C., but in combination with other agents for controlling viscosity actually improve the rheological properties of a drilling mud.

The new products of our invention are effective for controlling fluid loss in all commonly-used types of drilling muds. They are also compatible with and effective in oil-emulsion muds, and may be used in conjunction with additives which are primarily dispersants, such as bark derivatives, quebracho, lignosulfonates, lignites (ground or NaOH solubilized), sulfite extracts of redwood bark and tannins, such as eucalyptus extract, etc. Another important property of the new products is that in many muds they will act also as deflocculents, eliminating the need for the latter.

Representative drilling muds were made up in the laboratory as stock materials for use in examination of the effectiveness of the various fluid loss control agents in the following manner:

(A) A synthetic hard water mud was prepared by adding 39 parts $CaSO_4.2H_2O$, 18.5 parts $MgSO_4.7H_2O$, 46.6 parts $Na_2SO_4.10H_2O$ and 22.7 parts NaCl to 12,600 parts of distilled water. 6,000 parts of low-yield California clay was added to the hard water and the whole mixed with a high speed propeller-type mixer for 30 minutes, after which the resultant mixture was aged overnight at room temperature. Prior to use, this base mud was again mixed for 15 minutes at high speed.

Samples of low pH hard water mud were prepared from the above base mud by adding the required amount of fluid loss control agent to an aliquot thereof and rolling the sample overnight in an aging cabinet at 115 r.p.m. and 70° C.

(B) Oil-emulsion tests were run on the foregoing samples by adding 15% of diesel oil (based on mud volume) to a portion of the above sample and re-aging them once more overnight at 115 r.p.m. and 70° C., as before, prior to testing.

(C) In the case of high temperature aging tests, the desired amount of fluid loss control agent was mixed into an aliquot of the above base mud (A) and stirred at high speed for 5 minutes. The sample was then transferred to an aging cell and aged for the desired time and temperature. (Our standard test is to age at 190° C. for 3 hours.) The aged sample was then removed from the cell and mixed at high speed for 5 minutes prior to testing.

(D) A stock supply of a base mud for lime mud testing was prepared by adding 2500 parts of low-yield California clay, 2500 parts of low-yield Texas shale and 250 parts of Bentonite (Controlgel) to 15,000 parts of distilled water. The mixture was then stirred for 30 minutes at high speed, aged overnight at room temperature and again mixed for 15 minutes at high speed prior to sampling.

Lime mud samples were prepared from the foregoing base mud by adding lime equivalent to 5 lbs./bbl., NaOH equivalent to 2.4 lbs./bbl. and mud thinners and fluid loss control agents as desired to an aliquot thereof. Lime mud samples thus formed were then mixed at high speed for 10 minutes and aged at 115 r.p.m. and 70° C. overnight before being tested.

(E) For oil-emulsion testing in this case, 10% diesel oil (based on mud weight) was added to portions of the foregoing samples and the mixtures were re-aged at 115 r.p.m. and 70° C. overnight in the aging cabinet prior to testing.

The physical properties of the drilling muds were tested in the laboratory by procedures developed by the American Petroleum Institute, as described in "Recommended Practice for Standard Field Procedure for Testing Drilling Fluids" (API, RR 29, 3rd ed., May 1950), modified by substitution of a Fann V. G. viscometer for the Stormer, as suggested by Rogers' "Composition and Properties of Oil Drilling Fluids," 1953 ed., pp. 103, 104. Important properties that were determined include viscosity, 0 and 10 minute gel strengths and fluid loss( often also termed "water loss," "filter loss," or simply "filtration"). The viscosity was determined using a Fann viscometer under standardized conditions. The zero gel strength ("0 Gel Strength") is the resistance of freshly-stirred mud to the initiation of flow. This was also measured with a Fann viscometer. The "10 Minute Gel Strength" is the resistance to initiation of flow of a mud that has been allowed to stand 10 minutes and is similarly determined. Thus, the 0 and 10-minute gel strengths indicate the gel-forming characteristics of the mud and give a measure of gel rate as well as gel strength. Fluid loss is a test in which a mud cake is formed by filtration and pressure against a filter permeable to water. Briefly, it comprises measuring the total volume of filtrate water obtained during a given time of pressure filtration which may conveniently be thirty minutes. This test serves to measure the ability of a drilling mud to form a thin filter cake on the bore hole wall to seal it off and thereby prevent loss of water to the formation being drilled. The properties given for drilling muds in the following table were obtained using the above-described tests.

EXAMPLE 12

The effectiveness of our new fluid loss control agents, when used in conjunction with hard water drilling muds, is illustrated in Table III wherein fluid loss agents as described in Table II are added to mud (A) and evaluated according to the A.P.I. methods.

TABLE III

Evaluation of Fluid Loss Control Agents in Hard Water Drilling Mud

| Fluid loss control agent No. (see Table II) | pH of mud | Apparent viscosity (centipoises) | Gel strengths lbs./100 sq. ft. | | Fluid loss, ml./30 mins. |
| --- | --- | --- | --- | --- | --- |
| | | | 0 min. | 10 mins. | |
| Control sample [1] | | | | | 35.0 |
| 1 | 8.1 | 13 | 3 | 8 | 13.8 |
| 2 | 8.0 | 20 | 10 | 17 | 11.5 |
| 3 | 8.0 | 15 | 5 | 12 | 12.4 |
| 4 | 8.0 | 14 | 5 | 12 | 13.0 |
| 5 | 8.1 | 15 | 8 | 19 | 12.6 |
| 6 | 8.0 | 27 | 13 | 40 | 13.4 |
| 7 | 7.8 | 15 | 5 | 13 | 10.8 |
| 8 | 7.9 | 20 | 8 | 22 | 16.8 |
| 11 | 8.1 | 17 | 9 | 20 | 13.0 |
| 12 | 7.6 | 15 | 6 | 13 | 11.4 |
| 13 | 8.1 | 16 | 8 | 16 | 12.8 |
| 14 | 7.9 | 16 | 8 | 15 | 10.6 |
| 15 | 8.0 | 14 | 7 | 13 | 12.6 |
| 16 | 8.2 | 16 | 7 | 16 | 12.4 |
| 17 | 7.7 | 16 | 9 | 18 | 13.4 |
| 18 | 7.8 | 15 | 7 | 14 | 12.9 |
| 19 | 8.2 | 15 | 6 | 18 | 15.2 |
| 20 | 8.2 | 11 | 4 | 12 | 13.9 |
| 21 | 8.2 | 15 | 5 | 14 | 13.6 |
| 22 | 8.0 | 17 | 8 | 16 | 12.2 |
| 23 | 8.0 | 14 | 7 | 14 | 12.8 |
| 24 | 7.7 | 17 | 11 | 24 | 18.7 |
| 25 | 7.6 | 12 | 6 | 12 | 11.7 |
| 26 | 8.0 | 17 | 9 | 21 | 12.4 |
| 27 | 8.0 | 13 | 6 | 13 | 16.5 |
| 28 | 8.1 | 14 | 10 | 15 | 14.4 |

[1] No fluid loss control agent added.

NOTE.—Fluid loss control agent was added at the rate of 3 lbs./bbl.

EXAMPLE 13

The effectiveness of our new fluid loss control agents, when used in conjunction with hard water oil-emulsion drilling muds, is illustrated in Table IV, wherein some of the fluid loss agents described in Table II were added to mud (B) and evaluated according to the A.P.I. methods.

TABLE IV
Evaluation of Fluid Loss Control Agents in Hard Water Oil-Emulsion Drilling Muds

| Fluid loss control agent No. (see Table II) | pH of mud | Apparent viscosity (centipoises) | Gel strengths lbs./100 sq. ft. | | Fluid loss, ml./30 mins. |
|---|---|---|---|---|---|
| | | | 0 min. | 10 mins. | |
| Control sample [1] | ---- | ---- | ---- | ---- | 31.0 |
| 1 | 7.8 | 21 | 7 | 16 | 8.2 |
| 2 | 7.7 | 21 | 8 | 18 | 10.5 |
| 3 | 7.8 | 18 | 6 | 18 | 11.8 |
| 4 | 7.8 | 17 | 6 | 15 | 11.6 |
| 5 | 7.8 | 18 | 8 | 17 | 11.6 |
| 6 | 7.7 | 26 | 10 | 27 | 10.2 |
| 7 | 7.7 | 15 | 8 | 16 | 8.8 |
| 8 | 7.7 | 24 | 6 | 16 | 16.0 |
| 11 | 7.8 | 20 | 9 | 20 | 11.7 |
| 12 | 7.6 | 16 | 8 | 17 | 9.0 |
| 13 | 7.6 | 18 | 8 | 16 | 11.8 |
| 22 | 7.8 | 19 | 6 | 16 | 10.1 |
| 23 | 7.9 | 17 | 4 | 12 | 10.4 |

[1] No fluid loss agent added.

NOTE.—Fluid loss control agents were added at the rate of 3 lbs./bbl., 15% of diesel oil was added to each sample.

EXAMPLE 14

The effectiveness of our new fluid loss control agents, when used in conjunction with lime-treated drilling muds, is illustrated in Table V, wherein some of the fluid loss control agents described in Table II were added to mud (C) and evaluated according to the A.P.I. methods.

TABLE V
Evaluation of Fluid Loss Control Agents in Lime-Treated Drilling Muds

| Fluid loss control agent No. (see Table II) | pH of mud | Apparent viscosity (centipoises) | Gel strengths lbs./100 sq. ft. | | Fluid loss, ml./30 mins. |
|---|---|---|---|---|---|
| | | | 0 min. | 10 mins. | |
| Control sample [1] | ---- | ---- | ---- | ---- | 24.0 |
| 1 | 12.8 | 34 | 2 | 3 | 11.4 |
| 3 | 12.9 | 14 | 1 | 1 | 9.3 |
| 4 | 13.0 | 21 | 1 | 2 | 8.8 |
| 6 | 13.0 | 36 | 2 | 6 | 12.0 |
| 7 | 12.9 | 14 | 1 | 1 | 8.5 |
| 11 | 13.0 | 36 | 2 | 4 | 10.6 |
| 12 | 13.1 | 15 | 1 | 1 | 10.8 |
| 13 | 13.0 | 24 | 1 | 2 | 10.6 |
| 22 | 13.0 | 33 | 2 | 5 | 10.4 |
| 23 | 13.0 | 24 | 2 | 3 | 10.0 |

[1] No fluid loss control agent added.

NOTE.—Each of the foregoing samples contained; (a) 3 lbs./bbl. of the product defined in Example 1; (b) 5 lbs./bbl. of the given fluid loss control agent.

EXAMPLE 15

The effectiveness of our new fluid loss control agents, when used in conjunction with lime-treated oil-emulsion muds, is illustrated in Table VI, wherein some of the fluid loss control agents described in Table II were added to lime-treated oil-emulsion mud (E) and evaluated according to the A.P.I. methods.

TABLE VI
Evaluation of Fluid Loss Control Agents in Lime-Treated Oil-Emulsion Drilling Muds

| Fluid loss control agent No. (see Table II) | pH of mud | Apparent viscosity (centipoises) | Gel strengths lbs./100 sq. ft. | | Fluid loss, ml./30 mins. |
|---|---|---|---|---|---|
| | | | 0 min. | 10 mins. | |
| Control sample [1] | ---- | ---- | ---- | ---- | 24.0 |
| 1 | 12.8 | 22 | 1 | 2 | 9.2 |
| 3 | 13.0 | 10 | 1 | 0 | 9.8 |
| 4 | 12.9 | 12 | 1 | 1 | 8.6 |
| 6 | 12.5 | 19 | 1 | 1 | 9.3 |
| 7 | 13.0 | 12 | 1 | 1 | 8.7 |
| 11 | 12.8 | 16 | 1 | 1 | 7.8 |
| 12 | 13.0 | 13 | 1 | 1 | 10.5 |
| 13 | 12.9 | 13 | 1 | 1 | 9.2 |
| 22 | 13.0 | 20 | 1 | 2 | 9.8 |
| 23 | 13.0 | 20 | 1 | 1 | 8.4 |

[1] No fluid loss agent added.

NOTE.—Each of the foregoing samples contained: (a) 3 lbs./bbl. of the product defined in Example 1; (b) 5 lbs./bbl. of the given fluid loss control agent; (c) 10% of diesel oil.

EXAMPLE 16

The effectiveness of our new fluid loss control agents, when used at high temperatures, is demonstrated in Table VII, wherein some of the fluid loss control agents described in Table II were added to aliquots of hard water drilling mud (A) and aged at 190° C. for 3 hours prior to being evaluated by the afore-described A.P.I. standard methods.

TABLE VII
Evaluation of Fluid Loss Control Agents in Hard Water Muds at High Temperatures

| Fluid loss control agent No. (see Table II) | pH of mud | Apparent viscosity (centipoises) | Gel strengths lbs./100 sq. ft. | | Fluid loss, ml./30 mins. |
|---|---|---|---|---|---|
| | | | 0 min. | 10 mins. | |
| Control sample [1] | ---- | ---- | ---- | ---- | 35.0 |
| 1 | 8.4 | 11 | 6 | 23 | 12.6 |
| 3 | 8.0 | 10 | 4 | 15 | 12.0 |
| 4 | 7.8 | 9 | 5 | 15 | 12.2 |
| 11 | 7.8 | 13 | 7 | 26 | 13.4 |
| 13 | 7.8 | 9 | 4 | 15 | 13.6 |
| 14 | 8.0 | 8 | 1 | 7 | 13.3 |
| 22 | 8.0 | 13 | 6 | 54 | 15.1 |
| 23 | 8.0 | 11 | 4 | 27 | 13.8 |

[1] No fluid loss control agent added.

NOTE.—Fluid loss control agents were added at the rate of 4 lbs./bbl.

A comparison of the effectiveness of the fluid loss agents of our invention with that of two commonly-used commercial agents under similar high temperature conditions is summarized in Table VIII. The indicated amounts of said agents were added to aliquots of hard water mud (A) and aged at 190° C. for 3 hours.

TABLE VIII

| Additive | Amount added, lbs./bbl. | pH of mud | Apparent viscosity (centipoises) | Gel strengths, lbs./100 sq. ft. | | Fluid loss, ml./30 min. |
|---|---|---|---|---|---|---|
| | | | | 0 min | 10 min | |
| Control | None | 8.0 | 10 | 14 | 38 | 32 |
| Extract of Example 1 | 4 | 8.4 | 17 | 2 | 10 | 28 |
| Product 1, Example 10 | 4 | 8.4 | 11 | 7 | 18 | 14 |
| Carboxymethylcellulose | 1 | 8.4 | 10 | 10 | 29 | 30 |
| Hydrolyzed polyacrylonitrile | 1 | 8.2 | 32 | 24 | 104 | 35 |

Another illustration of the heat stability properties of our new fluid loss control agents under conditions of prolonged high temperature aging in a hard water mud (A) is given in Table IX.

TABLE IX

| Aging treatment | Additive | pH of mud | Apparent viscosity (centipoises) | Gel strengths, lbs./100 sq. ft. | | Fluid loss, ml./30 min. |
|---|---|---|---|---|---|---|
| | | | | 0 min. | 10 min. | |
| No aging, tested after mixing. | A | 10.0 | 7 | 6 | 14 | 20.0 |
| | B | 10.1 | 22 | 13 | 43 | 11.2 |
| | C | 9.8 | 12 | 8 | 17 | 5.6 |
| | D | 10.2 | 9 | 5 | 19 | 7.6 |
| 1 hour at 204° C | A | 7.8 | 11 | 6 | 15 | 26.5 |
| | B | 8.0 | 11 | 7 | 26 | 24.3 |
| | C | 8.1 | 10 | 1 | 12 | 9.9 |
| | D | 8.1 | 11 | 4 | 18 | 11.6 |
| 5 hours at 204° C | B | 7.9 | 11 | 6 | 31 | 25.5 |
| | C | 8.1 | 10 | 1 | 10 | 10.7 |
| | D | 8.0 | 11 | 2 | 26 | 13.4 |
| 10 hours at 204° C | B | 8.0 | 15 | 15 | 42 | 25.0 |
| | C | 8.0 | 12 | 1 | 18 | 11.4 |
| | D | 8.1 | 17 | 12 | 59 | 13.8 |
| 13 hours at 204° C | B | 7.7 | 18 | 27 | 67 | 25.3 |
| | C | 8.1 | 14 | 2 | 22 | 11.8 |
| | D | 8.2 | 17 | 12 | 58 | 14.9 |

NOTE.—Additives: (A) 2 lbs./bbl. of the extract of Example 1; (B) 2 lbs./bbl. of the extract of Example 1 plus 2 lbs./bbl. purified carboxymethylcellulose (CMC); (C) 2 lbs./bbl. of the extract of Example 1 plus 4 lbs./bbl. of product 3 of Example 10; (D) 4 lbs./bbl. of product 3 of Example 10. (All samples also contained 0.4 lb./bbl. of NaOH).

The following table shows the results of testing the products of Example 2B in a hard water drilling mud.

EXAMPLE 17

A test sample of a hard water drilling mud was prepared according to the procedure set out in Section (A), to which was added the fluid loss control agent of Example 2B at the rate of 3 lbs./bbl. Upon being tested by the given methods, the following results were obtained:

| | |
|---|---|
| pH of Mud | 8.0 |
| Apparent viscosity (cps.) | 16.0 |
| Gel strength (lbs./100 sq. ft.): | |
| 0 min | 8 |
| 10 min | 15 |
| Fluid loss with control agent (ml./30 min.) | 12.7 |
| Fluid loss without control agent (ml./30 min.) | 35.0 |

We claim:

1. The new water-soluble, heat stable, product formed by reacting in an alkaline solution at a temperature of from 75° C. to 175° C., for times ranging from 15 minutes to 24 hours a polymethylolphenol condensate having a combined formaldehyde to phenol molar ratio of from 1.8 to 3.0 with a bark derivative in a weight ratio of phenol to bark derivative of from 0.1 to about 0.4, said bark derivative being obtained by digesting a coniferous bark at a temperature of from 105° to 200° C. in an aqueous solution of a compound of the group consisting of a sulfurous acid salt of sodium, potassium and ammonium while maintaining said salt in the reaction solution, said heating being continued for from 15 to 240 minutes until a considerable proportion of the originally insoluble part of the bark is converted into water-soluble sulfonate salts, said sulfurous acid salt being in such proportions as to retain in solution at the conclusion of the digestion an equivalent of from 0.1 to 0.3 part of $SO_2$ to one part of bark based on the oven dry weight of the bark, and separating in solution said bark derivative from a bark residue.

2. The product of claim 1 in which the bark derivative is formed by digesting the bark in an aqueous solution of a mixture of sulfite and bisulfite of said salts.

3. The product of claim 1 in which the bark derivative is formed by digesting a coniferous bark of the group consisting of Douglas fir, white fir, western hemlock, eastern hemlock, Southern yellow pine, ponderosa pine, lodgepole pine, Sitka spruce and redwood.

4. The product of claim 1 wherein the bark derivative is reacted with the polymethylolphenol while in an aqueous solution containing sodium hydroxide.

5. The product of claim 1, wherein the polymethylolphenol is formed by reacting from 2.0 to 3.0 moles of formaldehyde with 1.0 mole of phenol in an aqueous solution containing from 0.25 to 1.0 mole of sodium hydroxide and this polymethylol phenol is reacted in the alkaline solution with the bark derivative.

6. The new water-soluble, heat stable product formed by reacting in an alkaline solution at a temperature of from 75° C. to 175° C., for times ranging from 15 minutes to 24 hours, a polymethylol phenol condensate having a combined formaldehyde to phenol molar ratio of from 1.8 to 3.0 with a sulfited tannin material from quebracho wood in a weight ratio of phenol to sulfited tannin material of from 0.1 to 0.4, said sulfited tannin material having been prepared by reacting quebracho wood with an aqueous solution of a compound of the group consisting of a sulfurous acid salt of sodium, potassium and ammonium while maintaining said salt in the reaction solution, said heating being continued for from 15 to 240 minutes until a considerable proportion of the originally insoluble part of the quebracho wood is converted into water-soluble sulfonate salts, said sulfurous acid salt being in such proportions as to retain in solution at the conclusion of the digestion an equivalent of from 0.1 to 0.3 part of $SO_2$ to one part of quebracho wood based on the oven dry weight of the wood.

7. The product of claim 6 in which the sulfited material is formed by sulfiting an aqueous extract of quebracho wood with the sulfurous acid salt.

8. The product of claim 6 in which the sulfited material is formed by digesting quebracho wood chips with said aqueous solution at from 105° to 200° C.

References Cited in the file of this patent

UNITED STATES PATENTS

| | | |
|---|---|---|
| 1,269,627 | McCoy | June 18, 1918 |
| 2,104,501 | Adams et al. | Jan. 4, 1938 |
| 2,144,297 | Noerr et al. | Jan. 17, 1939 |
| 2,214,689 | Burrell | Sept. 10, 1940 |
| 2,282,928 | Bauer | May 12, 1942 |
| 2,331,281 | Wayne | Oct. 12, 1943 |
| 2,387,619 | Seidel et al. | Oct. 23, 1945 |
| 2,610,138 | Heritage | Sept. 9, 1952 |
| 2,663,698 | Compton | Dec. 22, 1953 |
| 2,681,312 | Salathiel | June 15, 1954 |
| 2,694,051 | Black | Nov. 9, 1954 |
| 2,697,081 | Heritage | Dec. 14, 1954 |
| 2,999,108 | Gray et al. | Sept. 5, 1961 |

OTHER REFERENCES

MacLean et al.: Pulp and Paper Magazine of Canada, August 1952, pages 111–114.